US012618432B2

(12) United States Patent
   Ishihara

(10) Patent No.: US 12,618,432 B2
(45) Date of Patent: May 5, 2026

(54) CASING CAP AND CONTROL CABLE CONNECTING STRUCTURE WITH CASING CAP

(71) Applicant: HI-LEX CORPORATION, Hyogo (JP)

(72) Inventor: Hironari Ishihara, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 18/502,448

(22) Filed: Nov. 6, 2023

(65) Prior Publication Data

US 2024/0151261 A1     May 9, 2024

(30) Foreign Application Priority Data

Nov. 8, 2022     (JP) .................................. 2022-179064

(51) Int. Cl.
   *F16C 1/26*          (2006.01)
(52) U.S. Cl.
   CPC .................................... *F16C 1/262* (2013.01)
(58) Field of Classification Search
   CPC ...................................................... F16C 1/262
   See application file for complete search history.

(56) References Cited

U.S. PATENT DOCUMENTS

| | | | | | |
|---|---|---|---|---|---|
| 4,007,647 | A | * | 2/1977 | Carlson ................ | F02M 13/026 |
| | | | | | 74/502 |
| 6,153,827 | A | * | 11/2000 | Taranto ..................... | F16C 1/26 |
| | | | | | 439/473 |

| | | | | | |
|---|---|---|---|---|---|
| 6,349,611 | B1 | | 2/2002 | Nagle et al. | |
| 7,201,081 | B2 | * | 4/2007 | Mossler .................. | F16C 1/101 |
| | | | | | 74/501.5 R |
| 11,542,114 | B2 | | 1/2023 | Suzuki | |
| 2022/0371851 | A1 | | 11/2022 | Suzuki | |

FOREIGN PATENT DOCUMENTS

| | | | |
|---|---|---|---|
| CN | 115385162 | A | 11/2022 |
| JP | S5497628 | U | 7/1979 |
| JP | S60127116 | U | 8/1985 |
| JP | 2013096440 | A | 5/2013 |
| JP | 2014091920 | A | 5/2014 |
| JP | 2022179064 | A | 12/2022 |

OTHER PUBLICATIONS

Japanese Office Action from Corresponding Japanese Patent Application No. JP2022-179064, Dec. 16, 2025.

* cited by examiner

*Primary Examiner* — Vicky A Johnson
(74) *Attorney, Agent, or Firm* — Workman Nydegger

(57)          ABSTRACT

A casing cap is connected to an end of an outer casing through which an inner cable is inserted, the casing cap comprising: a main body portion having a curved guide path guiding the inner cable in a curved state; an outer casing connecting portion protruding from the main body portion at a one-side end in an extending direction of the guide path; and an engaging portion for engaging the casing cap with an mounting target, wherein the engaging portion protrudes from the main body portion at the other-side end in the extending direction of the guide path.

7 Claims, 11 Drawing Sheets

CASING CAP AND CONTROL CABLE CONNECTING STRUCTURE WITH CASING CAP

TECHNICAL FIELD

The present invention relates to a casing cap and a control cable connecting structure with the casing cap.

BACKGROUND OF THE INVENTION

A control cable is provided along a desired routing path in an installation target where the control cable is provided. For example, when an installation target for the control cable is a vehicle, various parts are arranged in the vehicle in a desired layout. Therefore, the control cable is routed while avoiding these parts and connected to an operation target to be operated by the control cable. As mentioned above, the routing path of the control cable is restricted by other parts provided in the installation target, and therefore the control cable may have to be bent in the vicinity of the operation target.

In such a case, for example, as shown in JP 2013-96440 A, a restricting member is used which holds an outer casing in a curved state. This restricting member is mounted to an end region of the outer casing and maintains the curved state of the end region of the outer casing in the vicinity of the operation target. Thereby, an inner cable is changed direction within the curved outer casing in the vicinity of the operation target and connected to the operation target, so that an operating force is transmitted via the inner cable even in the restricted routing path.

SUMMARY OF THE INVENTION

However, in a case of a structure using a restricting member as in JP 2013-96440 A, a casing cap for engaging the end of the outer casing with a mounting member such as a bracket is provided at the tip of the curved outer casing. Therefore, a straight portion (casing cap portion) of a predetermined length is required at the tip of the curved portion of the outer casing. Accordingly, even if it is necessary to curve the outer casing in the vicinity of the operation target, the straight portion of the casing cap becomes an obstacle, reducing a layout flexibility of the control cable.

Therefore, it is an object of the present invention to provide a casing cap and a control cable connecting structure capable of improving a layout flexibility of a control cable.

The casing cap of the present invention is a casing cap connected to an end of an outer casing through which an inner cable is inserted, wherein the casing cap comprises: a main body portion having a curved guide path guiding the inner cable in a curved state; an outer casing connecting portion protruding from the main body portion at a one-side end in an extending direction of the guide path; and an engaging portion for engaging the casing cap with an mounting target, wherein the engaging portion protrudes from the main body portion at the other-side end in the extending direction of the guide path.

Moreover, the control cable connecting structure of the present invention comprises: an inner cable; an outer casing through which the inner cable is inserted; an operation target to which one end of the inner cable is connected; the above-described casing cap; and a mounting target being substantially plate-shaped, wherein the mounting target engages with the engaging portion of the casing cap and extends substantially perpendicularly to the inner cable led out from the engaging portion, wherein the operation target is configured to move between a first position and a second position by being operated by the inner cable or operate the inner cable by moving between the first position and the second position, wherein the first position is a position closer to the engaging portion with respect to the second position, and wherein a length from the operation target to the engaging portion in the first position is shorter than a radius of curvature of the curved guide path.

According to the casing cap and the control cable connecting structure of the present invention, the layout flexibility of the control cable can be improved.

DETAILED DESCRIPTION

The casing cap and the control cable connecting structure according to one embodiment of the present invention will be described below with reference to the drawings. It should be noted that the embodiment shown below is merely an example, and the casing cap and the control cable connecting structure of the present invention are not limited to the following embodiment.

In the present specification, the expression "perpendicular to A" and that similar thereto refer to not only a direction being completely perpendicular to A, but refer to include being substantially perpendicular to A. Moreover, in the present specification, the expression "parallel to B" and that similar thereto refer to not only a direction being completely parallel to B, but refer to include being substantially parallel to B. Furthermore, in the present specification, the expression "a C-letter shape" and that similar thereto refer to not only a complete C-letter shape, but refer to include a shape reminiscent of a C-letter shape in appearance (a substantially C-letter shape).

Figure 1:
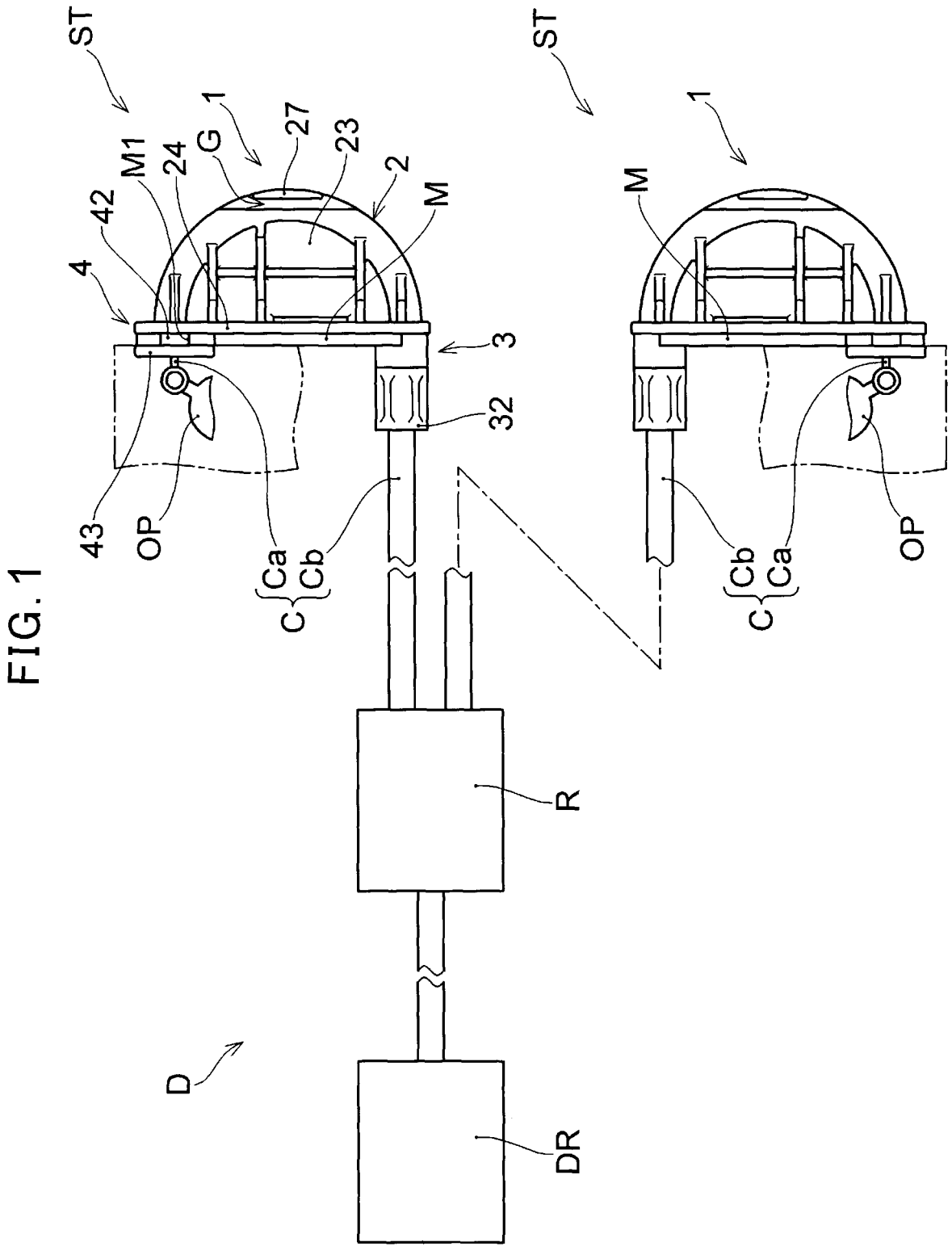
FIG. 1 is an overall view of a control cable connecting structure with a casing cap according to one embodiment of the present invention.

As shown in FIG. 1, a casing cap 1 according to the present embodiment is a member connected to an end of an outer casing Cb through which an inner cable Ca is inserted (hereinafter, the inner cable Ca and the outer casing Cb are collectively referred to as a control cable C). The casing cap 1 is provided for mounting the end of the outer casing Cb, which has been routed along a predetermined routing path in an installation target such as a vehicle, to a predetermined mounting target M via the casing cap 1. The installation target is not limited to the vehicle as long as the casing cap 1 and the control cable C are installed, and may be a structure other than the vehicle. A material constituting the casing cap 1 is not limited as long as the material has a predetermined rigidity, and may be, for example, a hard resin.

In the present embodiment, the casing cap 1 constitutes a control cable connecting structure ST together with the inner cable Ca, the outer casing Cb, an operation target OP which will be mentioned below, and the mounting target M in the installation target such as a vehicle. The control cable connecting structure ST is a structure in which one end of the inner cable Ca is connected to the operation target OP and one end of the outer casing Cb is connected to the mounting target M via the casing cap 1, in the installation target such as a vehicle. In the present embodiment, the control cable connecting structure ST is a part of a control cable operating device D, as shown in FIG. 1. In the present embodiment, the control cable operating device D comprises a drive section DR and a control cable connecting structure ST. More specifically, the control cable operating device D comprises a drive section DR, a relay section R connected to the drive section DR, and a pair of control cable connecting structures ST branched by the relay section R. A pair of control cables C extend from the relay section R toward each of a pair of operation targets OP. When the drive section DR is driven, each of the pair of operation targets OP is operated by the inner cable Ca of the pair of control cables C. Application of the control cable operating device D is not limited. For example, the control cable operating device D may be applied to an unlocking mechanism such as a seat reclining mechanism, a hood opener for an engine hood of a vehicle, and the like.

The control cable C comprises an inner cable Ca and an outer casing Cb through which the inner cable Ca is inserted. The inner cable Ca is connected to the operation target OP so that an operating force can be transmitted to the operation target OP. In the present embodiment, one end of the inner cable Ca is connected to the operation target OP, the other end of the inner cable Ca is connected to the drive section DR, and the inner cable Ca is operated by a driving force of the drive section DR, so that the operation target OP is operated. As will be mentioned below, the control cable C may be configured so that the operation target OP functions as a drive section, and the inner cable Ca is operated by the operation target OP, thereby applying an operating force to parts other than the operation target OP.

Figure 2:
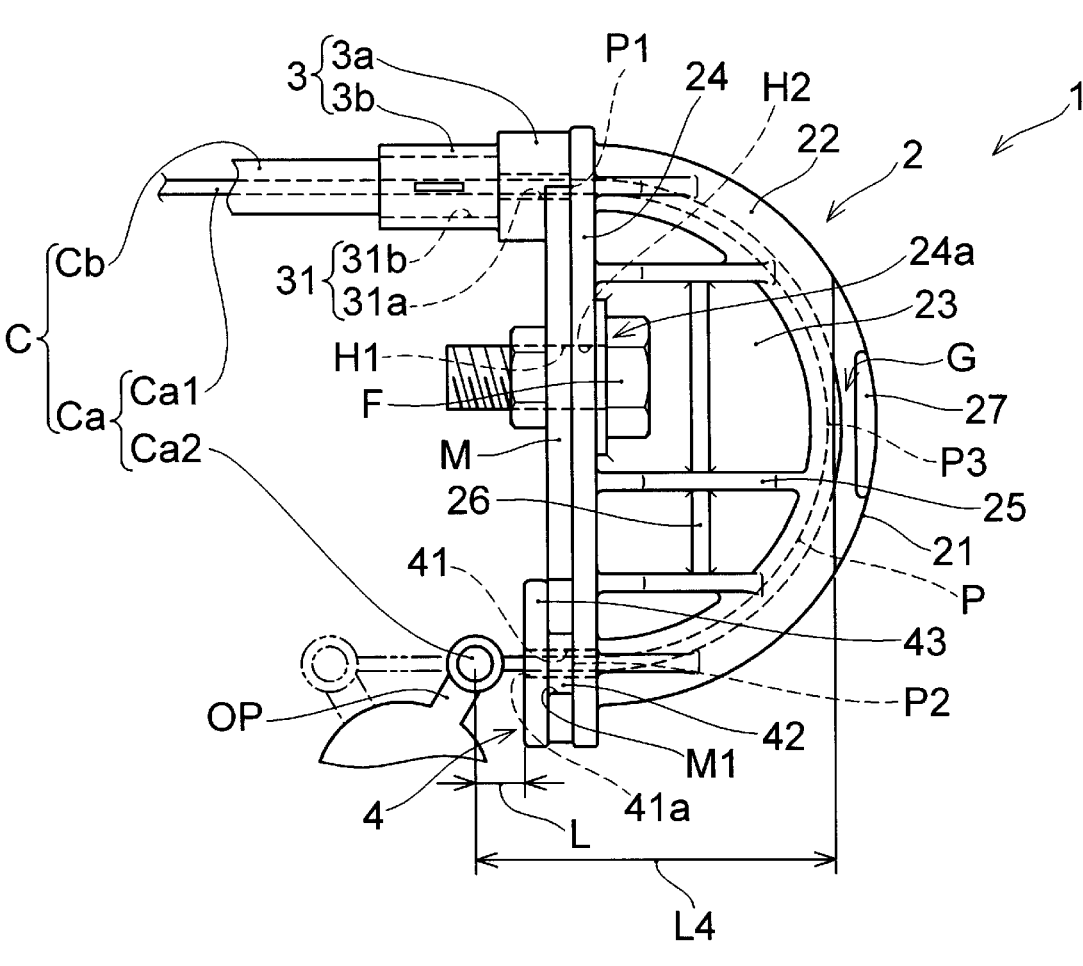
FIG. 2 is a view showing a state where the casing cap in FIG. 1 is mounted to a mounting target.

As shown in FIG. 2, the inner cable Ca comprises a cable main body Ca1 and a cable end Ca2 provided at the end of the inner cable Ca. As the cable main body Ca1, a publicly-known cable such as a steel wire having a predetermined twisted wire structure can be used. The cable end Ca2 is extended in a radial direction of the cable main body Ca1 with respect to the cable main body Ca1 and is configured to engage with the operation target OP in an axial direction of the cable main body Ca1. The cable end Ca2 is provided by a publicly-known forming means such as casting, with the cable main body Ca1 being led out from a lead-out port 41a of the casing cap 1, which will be mentioned below. Moreover, a shape of the cable end Ca2 is not limited as long as the cable end Ca2 can be engaged with the operation target OP so that the operation target OP can be operated.

The outer casing Cb is a flexible tube-shaped member into which the inner cable Ca (cable main body Ca1) is inserted. A material and a structure of the outer casing Cb can be the same as those of a publicly-known outer casing. The outer casing Cb is routed along a curved routing path in an installation target such as a vehicle. One end of the outer casing Cb is connected to an outer casing connecting portion 3 of the casing cap 1, which will be mentioned below. The other end of the outer casing Cb is connected to the relay section R in the present embodiment.

The mounting target M is a target (member, part) to which the casing cap 1 is mounted. The mounting target M is composed of a material having a predetermined rigidity, such as, for example, metal, so that the casing cap 1 can be held in predetermined position and posture. A shape and a structure of the mounting target M are not limited as long as the casing cap 1 can be mounted to the mounting target M. In the present embodiment, the mounting target M is formed into a substantially plate shape to which the casing cap 1 can be mounted, as shown in FIGS. 1 and 2. More specifically, as shown in FIGS. 1 and 2, the mounting target M engages with an engaging portion 4, which will be mentioned below, of the casing cap 1, and is formed in a substantially plate shape extending substantially perpendicularly to the inner cable Ca led out from the engaging portion 4. It should be noted that, in the present specification, the mounting target M formed in the "substantially plate shape" refers to a mounting target having a plate shape or a shape approximate to the plate shape. The substantially plate-shaped mounting target M may at least have a substantially plate-shaped part to which the casing cap 1 is mounted, and the entire mounting target M does not need to be plate-shaped. The mounting target M may be a part of a casing or a partition wall that at least partially partitions a space in which the operation target OP is provided, or may be mounted to the casing or partition wall.

Figure 3:
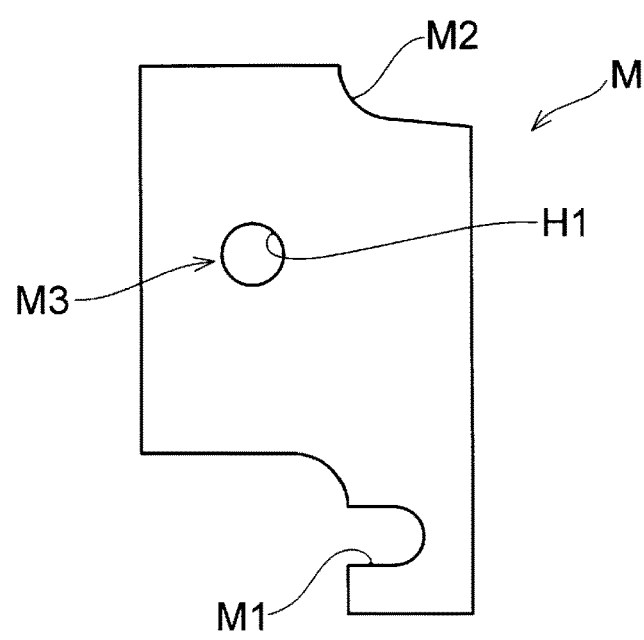
FIG. 3 is a schematic view of the mounting target.
Figure 4:
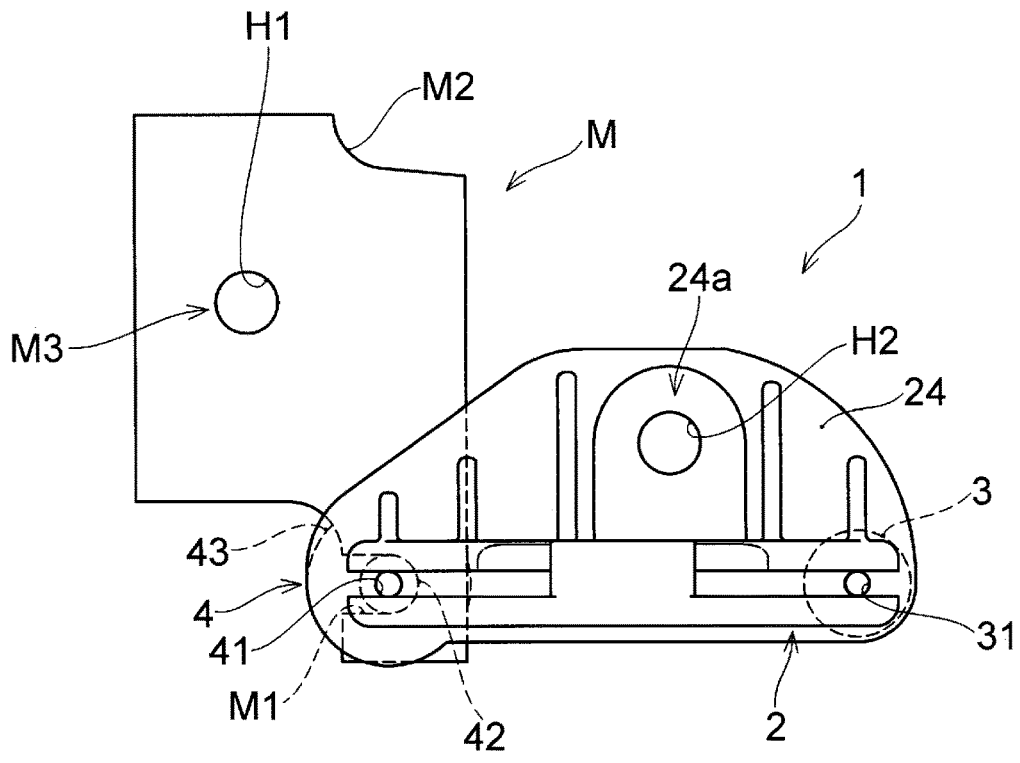
FIG. 4 is a schematic view showing a state where the casing cap is being mounted to the mounting target, in which an engaging portion of the casing cap engages with an engaged portion of the mounting target.
Figure 5:
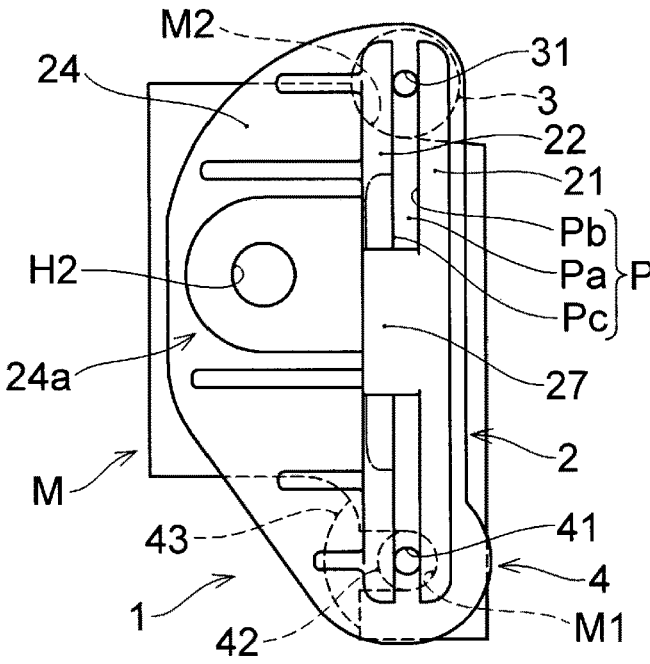
FIG. 5 is a schematic view showing a state where the casing cap is being mounted to the mounting target, which shows a state before a fixing member is inserted, in which the casing cap is aligned at a fixed position with respect to the mounting target.

In the present embodiment, the mounting target M comprises an engaged portion M1 with which the engaging portion 4 of the casing cap 1 engages and a holding portion M2 holding the outer casing connecting portion 3, as shown in FIGS. 3 to 5. FIG. 3 is a diagram of the mounting target M viewed in a plate thickness direction (left-right direction in FIG. 2). Moreover, the mounting target M has a fixed portion M3 that is fixed to the fixing portion 24a of the casing cap 1 via a fixing member F, as will be mentioned below.

The engaged portion M1 is a portion with which the engaging portion 4 of the casing cap 1 engages. In the present embodiment, the engaged portion M1 has an engaging groove with which the engaging portion 4 can engage, as shown in FIGS. 3 to 5. Specifically, the engaged portion M1 has a substantially U-shaped engaging groove into which a cylindrical portion 42, which will be mentioned below, of the engaging portion 4 can enter. As shown in FIG. 2, the cylindrical portion 42 of the engaging portion 4 enters into the engaging groove of the engaged portion M1, and a flange portion 43 and a projecting portion 24 at both ends of the cylindrical portion 42 engage with both sides of the mounting target M in an axial direction, respectively. Thereby, the casing cap 1 is mounted to the mounting target M in a state where movement of the substantially plate-shaped mounting target M in the plate thickness direction (horizontal direction in FIG. 2) is restricted.

The holding portion M2 is a portion where the outer casing connecting portion 3 is held. In the present embodiment, the holding portion M2 is configured so that the outer periphery of the outer casing connecting portion 3 abuts onto the holding portion M2 and temporarily holds the outer casing connecting portion 3 at a predetermined position. More specifically, when the casing cap 1 in which the engaging portion 4 engages with the engaged portion M1 rotates about the engaging portion 4 (rotation in counterclockwise direction from the state in FIG. 4 to the state in FIG. 5) and the outer periphery of the outer casing connecting portion 3 abuts onto the holding portion M2 (see FIG. 5), the holding portion M2 is provided so as to restrict rotation in one direction about the engaging portion 4 of the casing cap 1 (rotation in counterclockwise direction in FIG. 5). It should be noted that the holding portion may have the same shape and structure as the engaged portion M1 in case that the outer casing connecting portion has the same structure as the engaging portion (see FIGS. 11 and 12).

The fixed portion M3 is a portion to which the fixing portion 24a of the casing cap 1, which will be mentioned below, is fixed. In the present embodiment, the fixed portion M3 has a through hole H1 into which a fixing member F (such as a bolt and a nut) is inserted. In the present embodiment, when the fixing member F is inserted into a through hole H2 of the fixing portion 24a and the through hole H1 of the fixed portion M3 of the casing cap 1 (see FIG. 2), the casing cap 1 is securely fixed to the mounting target M.

A method of fixing the casing cap 1 to the mounting target M is not limited. In the present embodiment, the engaging portion 4 engages with the substantially plate-shaped mounting target M in the plate thickness direction of the mounting target M, and the fixed portion M3 is fixed to the fixing portion 24a without the outer casing connecting portion 3 engaging with the mounting target M in the plate thickness direction of the mounting target M, so that the casing cap 1 is fixed to the mounting target M. Specifically, as shown in FIG. 4, a cylindrical portion 42, which will be mentioned below, of the engaging portion 4 enters into the engaging groove of the engaged portion M1 and engages with the mounting target M. With the casing cap 1 being rotated about the axis of the cylindrical portion 42 from the state shown in FIG. 4, when the casing cap 1 is located at a predetermined fixed position which is a finally fixed position (see FIG. 5), the outer periphery of the outer casing connecting portion 3 (an outer periphery of a first part 3a which will be mentioned below) abuts onto the holding portion M2 of the mounting target M. Thereby, the casing cap 1 is positioned (temporarily held) at a predetermined fixed position. In the present embodiment, in this state, the through hole H1 of the fixed portion M3 and the through hole H2 of the fixing portion 24a are aligned so that the fixed member F can be inserted therein. Therefore, when the casing cap 1 is rotated about the cylindrical portion 42 and the outer periphery of the outer casing connecting portion 3 abuts onto the holding portion M2 of the mounting target M, the casing cap 1 and the mounting target M are in a state where the fixing member F can be inserted and the casing cap 1 is positioned at a predetermined fixed position. Accordingly, it becomes easy to insert the fixing member F into the through hole H1 of the fixed portion M3 and the through hole H2 of the fixing portion 24a, so that it becomes easy to mount the casing cap 1 to the mounting target M.

A position where the mounting target M is provided is not limited, but in the present embodiment, as shown in FIG. 2, the mounting target M is provided at a position in the vicinity of the operation target OP. The position in the vicinity of the operation target OP may be a position where a distance L from a connecting part between the operation target OP and the cable end Ca2 to the lead-out port 41a of the casing cap 1 (see FIG. 2) is, for example, 100 mm or less, preferably 50 mm or less, and more preferably 30 mm or less, when the operation target OP is located at a position closest to the casing cap 1 (a first position which will be mentioned below), in a state where the casing cap 1 is mounted to the mounting target M.

As shown in FIG. 2, one end of the inner cable Ca (cable end Ca2) is connected to the operation target OP. The operation target OP may be a target that moves by being operated by the inner cable Ca or may be a target that operates the inner cable Ca by the movement of the operation target OP. In the present embodiment, as shown in FIG. 2, the operation target OP is configured to move between the first position (the position indicated by the solid line in FIG. 2) and the second position (the position indicated by the two-dot chain line in FIG. 2) by being operated by the inner cable Ca. More specifically, as shown in FIG. 1, one end of the inner cable Ca is connected to the operation target OP, the other end of the inner cable Ca is connected to the drive section DR, and the operation target OP becomes an operated portion to move between the first position and the second position by the inner cable Ca operated by the drive section DR. It should be noted that the first position (the position indicated by the solid line in FIG. 2) is a position closer to the engaging portion 4 (lead-out port 41a) with respect to the second position (the position indicated by the two-dot chain line in FIG. 2) and the second position is a position farther from the engaging portion 4 with respect to the first position.

It should be noted that, as mentioned above, the operation target may become a drive section and the operation target may be configured to operate the inner cable Ca by moving between the first position and the second position. For example, when the operation target is operated by a drive source, an operating force is applied from the operation target to one end of the inner cable Ca, so that the inner cable Ca may be operated, and the operated portion provided at the other end of the inner cable Ca may be operated.

As shown in FIG. 2, and 6 to 8, the casing cap 1 comprises: a main body portion 2 having a curved guide path P guiding the inner cable Ca in a curved state; an outer casing connecting portion 3 protruding from the main body portion 2 at a one-side end P1 in an extending direction of the guide path P; and an engaging portion 4 for engaging the casing cap 1 with an mounting target M and the engaging portion 4 protrudes from the main body portion 2 at the other-side end P2 in the extending direction of the guide path P. With this configuration, as shown in FIGS. 1 and 2, the inner cable Ca may be changed direction in the vicinity of the mounting target M without significantly curving the outer casing Cb in the vicinity of the mounting target M. Therefore, there is no need to bend the outer casing Cb in the vicinity of the mounting target M as in the case where the restricting member in JP 2013-96440 A is used and there is no need to provide a straight portion (casing cap part) at the tip of the curved portion which is required when the restricting member in JP 2013-96440 A is used. Accordingly, the layout flexibility of the control cable C can be improved, and the space required for cabling can be reduced. Moreover, when using the restricting member in JP 2013-96440 A, since mounting manner of the outer casing to the restricting member or bending manner of the outer casing differ depending on an operator, curved states of the outer casing and the inner cable may change each time. In addition, when the restricting member in JP 2013-96440 A is used, a stroke loss easily occurs due to forced bending of the outer casing. On the other hand, in the present embodiment, the curved state of the inner cable Ca becomes almost constant due to the guide path P provided in the main body portion 2, so that a stroke loss is less likely to occur. Moreover, as shown in FIG. 1, even if the routing path has to be sharply bended in the vicinity of the mounting target M, there is no need to mount the outer casing Cb to the restricting member after forcibly bending it. Therefore, mounting of the casing cap 1 to the mounting target M becomes easy.

Figure 7:
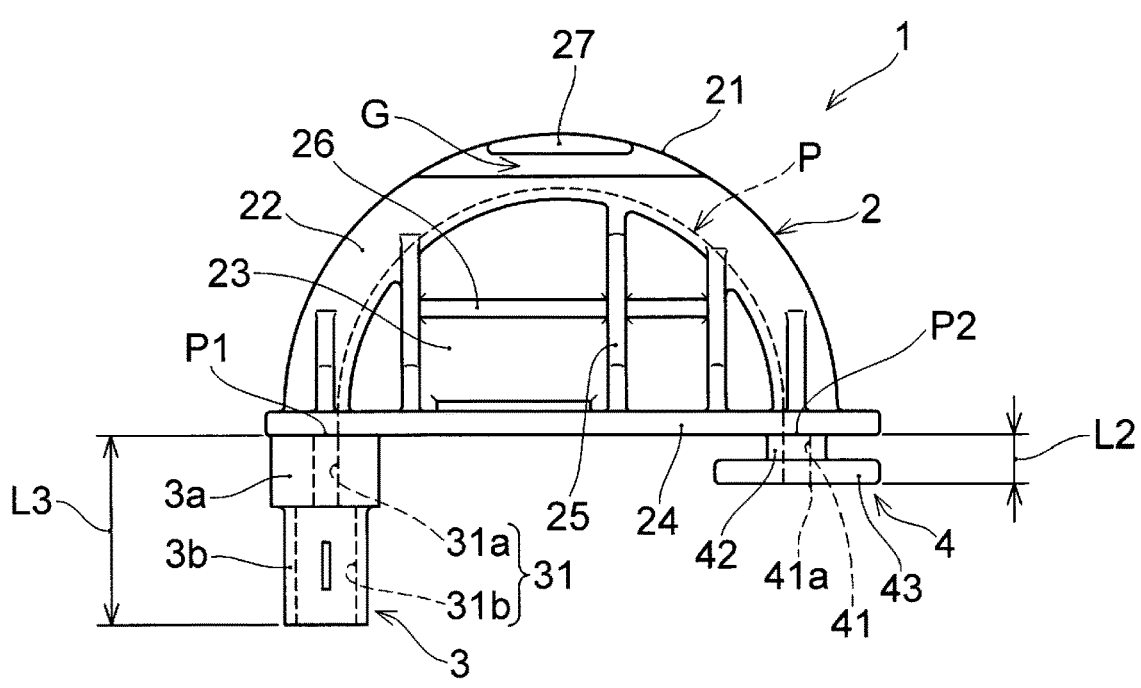
FIG. 7 is a front view of the casing cap in FIG. 1.

The outer casing connecting portion 3 is a portion to which the end of the outer casing Cb is connected, as shown in FIGS. 2 and 7. A shape and a structure of the outer casing connecting portion 3 are not limited as long as the end of the outer casing Cb can be connected to the outer casing connecting portion 3. In the present embodiment, the outer casing connecting portion 3 protrudes in a predetermined direction from a one-side end P1 in an extending direction of the guide path P, of the main body portion 2. Specifically, as shown in FIG. 7, the outer casing connecting portion 3 protrudes in a direction in which the guide path P is linearly extended from the one-side end P1 (in the present embodiment, a direction perpendicular to the projecting portion 24, which will be mentioned below).

In the present embodiment, the outer casing connecting portion 3 has a first insertion path 31 through which the inner cable Ca is inserted, as shown in FIG. 7. In the present embodiment, the outer casing connecting portion 3 is configured by a cylindrical portion protruding from the main body portion 2, and a first insertion path 31 is formed in the cylindrical portion. When the inner cable Ca is assembled to the casing cap 1, the inner cable Ca is passed through the first insertion path 31 and guided along the guide path P.

In the present embodiment, the outer casing connecting portion 3 comprises a first part 3a provided at a main body portion 2 side and a second portion 3b provided at a side being far from the main body portion 2, as shown in FIGS. 2 and 7. In the present embodiment, the first part 3a has a larger outer diameter than the second part 3b. Moreover, the first insertion path 31 has a small-diameter path 31a having a small diameter in the first part 3a and a large-diameter path 31b having a larger diameter than the small-diameter path 31a in the second part 3b. The small-diameter path 31a is sized so that the inner cable Ca can be inserted in the small-diameter path 31a but the outer casing Cb cannot be inserted in the small-diameter path 31a. Moreover, the large-diameter path 31b is sized so that the outer casing Cb can be inserted in the large-diameter path 31b. A method of connecting the outer casing Cb to the outer casing connecting portion 3 is not limited. In the present embodiment, the outer casing Cb is fixed to the outer casing connecting portion 3 by caulking. Specifically, in a state where the end of the outer casing Cb is inserted into the second part 3b of the outer casing connecting portion 3 (the large-diameter path 31b of the first insertion path 31), a cylindrical attached member 32 (see FIG. 1) is mounted on the outer periphery of the second part 3b, and the attached member 32 is caulked from the outside. Thereby, the outer casing Cb is fixed to the outer casing connecting portion 3.

The engaging portion 4 is a portion that engages with the mounting target M in order to mount the casing cap 1 to the mounting target M. In the present embodiment, the engaging portion 4 is configured to be mountable to the mounted target M being substantially plate-shaped (see FIGS. 1 and 2). In the present embodiment, the engaging portion 4 has a second insertion path 41 through which the inner cable Ca is inserted, as shown in FIGS. 2 and 7. The inner cable Ca guided to the guide path P passes through the second insertion path 41 and led out from the casing cap 1. A shape and a structure of the engaging portion 4 are not limited as long as the engaging portion 4 can engage with the mounting target M so that the casing cap 1 is held at a predetermined position with respect to the mounting target M. The engaging portion 4 protrudes from the main body portion 2 in a predetermined direction at the other-side end P2 of the guide path P opposite to the outer casing connecting portion 3, along the extending direction of the guide path P. In the present embodiment, the engaging portion 4 protrudes in a direction in which the guide path P is linearly extended from the other-side end P2 (in the present embodiment, a direction perpendicular to the projecting portion 24, which will be mentioned below).

In the present embodiment, as shown in FIG. 7, a protrusion amount L2 of the engaging portion 4 from the main body portion 2 in the extending direction of the second insertion path 41 is smaller than a protrusion amount L3 of the outer casing connecting portion 3 from the main body portion 2 in the extending direction of the first insertion path 31. In this way, when the protrusion amount L2 of the engaging portion 4 from the main body portion 2 is smaller, the straight portion required further from the other-side end P2 of the curved guide path P can be made small. Therefore, as shown in FIGS. 1 and 2, it is possible to arrange the operation target OP at a position close to the other-side end P2 which is a terminal end part of the curve of the guide path P. Accordingly, for example, a distance L4 (see FIG. 2) required between the operation target OP (at the first position) and a portion P3 farthest from the operation target OP (see FIG. 2), of the curved guide path P, in the extending direction of the second insertion path 41, can be shortened. Thereby, a space required for the casing cap 1 can be reduced in the installation target. The protrusion amount L2 of the engaging portion 4 from the main body portion 2 is not limited, but can be ½ or less, preferably ⅓ or less of the radius of curvature of the guide path P (distance from the point P3 to the projecting portion 24 in FIG. 2).

In the present embodiment, as shown in FIG. 2, the engaging portion 4 has a cylindrical portion 42 that extends with a length (in an axial direction) corresponding to a thickness of the substantially plate-shaped mounting target M and has the second insertion path 41 in the cylindrical portion 42, and a flange portion 43 that protrudes outward in a radial direction of the second insertion path 41 with respect to the cylindrical portion 42. A lead-out port 41a through which the inner cable Ca is led out to the outside of the casing cap 1 is provided on an end face on the opposite side to the main body portion 2, among end faces of the flange portion 43. In this case, a length in the extending direction of the second insertion path 41 from the other-side end P2 of the guide path P to the lead-out port 41*a* from which the inner cable Ca is led out is approximately the same as the total thickness of the thickness of the substantially plate-shaped mounting target M and the thickness of the flange portion 43. Therefore, the straight portion required from the guide path P to the lead-out port 41*a* becomes very short. Accordingly, in the installation target, the space required for the casing cap 1 can be further reduced, and the inner cable can be routed in a routing path that cannot be achieved with a structure required for providing a straight portion with a certain length as in JP 2013-96440 A. In the present embodiment, for example, the length from the operation target OP to the engaging portion 4 (the end face of the flange portion 43 having the lead-out port 41*a*) in the first position is shorter than the radius of curvature of the curved guide path P (distance from the point P3 to the projecting portion 24 in FIG. 2). The length from the operation target OP to the engaging portion 4 (the end face of the flange portion 43 having the lead-out port 41*a*) in the first position is not limited, but as mentioned above, it can be 100 mm or less, preferably 50 mm or less, and more preferably 30 mm or less.

The cylindrical portion 42 of the engaging portion 4 is a portion that enters into the engaging groove of the engaged portion M1 of the mounting target M. The cylindrical portion 42 is formed in a size that enters into the engaging groove of the engaged portion M1. In a state where the cylindrical portion 42 enters into the engaging groove of the engaged portion M1, portions extended in a radial direction of the cylindrical portion 42 with respect to the cylindrical portion 42 (in the present embodiment, the flange portion 43 and the projecting portion 24) engage with both sides of the substantially plate-shaped mounting target M, at both sides of the cylindrical portion 42 in the axial direction, respectively. Thereby, the casing cap 1 engages with the mounting target M in the extending direction of the second insertion path 41. A shape of the cylindrical portion 42 is not limited as long as the cylindrical portion 42 can enter into and engage with the engaging groove of the engaged portion M1. In the present embodiment, the cylindrical portion 42 has a cylindrical shape so that the casing cap 1 can be rotated about the axis of the cylindrical portion 42 in a state where the cylindrical portion 42 enters into the engaging groove. The second insertion path 41 inside the cylindrical portion 42 extends linearly from the other-side end P2 of the guide path P to the lead-out port 41*a*. The second insertion path 41 is formed in a size that allows the inner cable Ca to be inserted through the second insertion path 41.

The flange portion 43 extends outward in the radial direction of the cylindrical portion 42 with respect to the cylindrical portion 42. The flange portion 43 is formed in a substantially plate shape (disk shape in the present embodiment). The thickness of the flange portion 43 is approximately the same as the thickness of the substantially plate-shaped mounting target M (for example, 0.5 to 2 times the thickness of the mounting target M).

The main body portion 2 is a portion that guides the inner cable Ca led out from the end of the outer casing Cb in a curved state. As mentioned above, the main body portion 2 has a guide path P that guides the inner cable Ca in a curved state.

The guide path P is a portion that guides the inner cable Ca along a curved path. The guide path P is curved so as to change direction of the inner cable Ca from the one-side end P1 to the other-side end P2 at a predetermined angle. An angle of change of direction of the guide path P from the one-side end P1 to the other-side end P2 is not limited. The angle of change of direction of the guide path P is 180° in the present embodiment (see FIGS. 1 and 2), but can be, for example, 90 to 180°.

Figure 6:
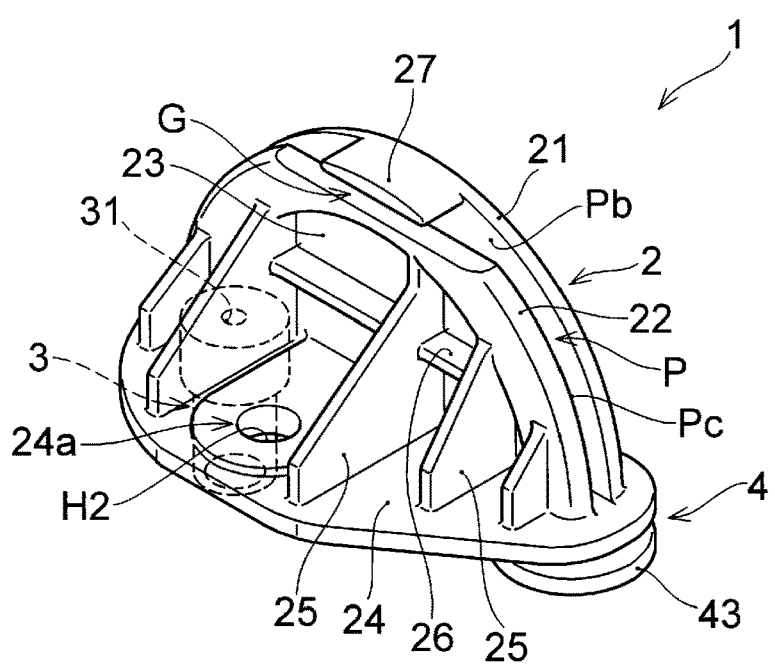
FIG. 6 is a perspective view of the casing cap in FIG. 1.

A shape and a structure of the guide path P are not limited as long as the inner cable Ca can be guided in a curved state. In the present embodiment, the guide path P is open to the outside in the radial direction so that the guide path P and a space outside the casing cap 1 communicate with each other, as shown in FIGS. 5 and 6. However, the guide path P may be a closed guide path so as not to communicate with the space outside the casing cap 1. The guide path P may be entirely open or partially open (partially closed). In the present embodiment, the guide path P is continuously curved from the one-side end P1 to the other-side end P2, but may partially have a straight path from the one-side end P1 to the other-side end P2.

In the present embodiment, as shown in FIGS. 5 and 6, the main body portion 2 comprises a first wall portion 21 and a second wall portion 22 provided opposite to the first wall portion 21, and the guide path P extends between the first wall portion 21 and the second wall portion 22. In the present embodiment, the guide path P is formed in a groove shape extending along the extending direction of the guide path P. More specifically, the guide path P is defined by a bottom portion Pa extending between the first wall portion 21 and the second wall portion 22 and inner surfaces Pb, Pc of the first wall portion 21 and the second wall portion 22. The guide path P is configured so that a cross section cut in a direction perpendicular to the extending direction of the guide path P has a substantially U-shape. When the guide path P is formed in a groove shape, the guide path P is open to the space outside the casing cap 1, as mentioned above, and it is easy to attach the inner cable Ca to the main body portion 2, as will be mentioned below (see FIGS. 9A to 9C).

In the present embodiment, the main body portion 2 has a plane portion 23 on the inside of the curve of the curved guide path P, as shown in FIGS. 2, 6, and 7. With the main body portion 2 having the plane portion 23, when a tension is applied to the inner cable Ca and a force in a direction toward a center of the curve of the guide path P is applied to the main body portion 2 (for example, when a force in a left direction is applied to the bottom portion Pa of the guide path P at the position of the point P3 in FIG. 2), the main body portion 2 is prevented from bending to deform the guide path P. Furthermore, when the main body portion 2 has the plane portion 23, it is possible to provide a reinforcing rib 25 that connects the plane portion 23 and the projecting portion 24 (see FIGS. 6 and 7), so that the casing cap 1 can be reinforced. In the present embodiment, the reinforcing rib 25 connects the plane portion 23 and the projecting portion 24 so as to be perpendicular to the plane portion 23 and the projecting portion 24, as shown in FIG. 6. More specifically, the reinforcing rib 25 is formed to be inclined so that a protrusion amount in a direction perpendicular to the plane portion 23 increases as the reinforcing rib 25 approaches the projecting portion 24. The main body portion 2 may have an auxiliary rib 26 that extends in a direction perpendicularly to the plane portion 23 and intersecting with the reinforcing rib 25 (see FIGS. 6 and 7).

In the present embodiment, the plane portion 23 is a semicircular part on an inner side of the guide path P in a radial direction. In the present embodiment, the plane portion 23 extends toward the projecting portion 24 in a plate shape from a position between the first wall portion 21 and the second wall portion 22 (position of the bottom portion Pa of the guide path P) in a direction in which the first wall portion 21 and the second wall portion 22 face each other. The first wall portion and the second wall portion may have a substantially semicircular shape instead of the arch shape shown in FIGS. 6 and 7. In this case, a part of the first wall portion and the second wall portion become plane portions, and the part of the first wall portion 21 and the second wall portion 22 have the same function as the plane portion 23 mentioned above.

Figure 8:
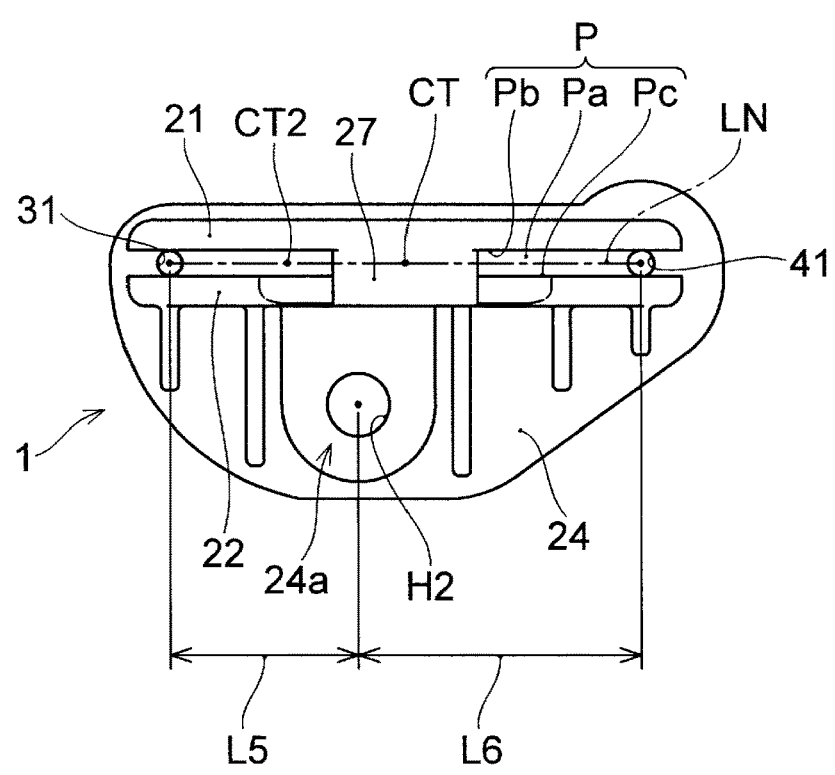
FIG. 8 is a top view of the casing cap in FIG. 1.

As shown in FIGS. 5, 6, and 8, the main body portion 2 comprises a projecting portion 24 extending in a direction intersecting with the first wall portion 21 and/or the second wall portion 22 so that, when the engaging portion 4 is mounted to the mounting target M being substantially plate-shaped, the projecting portion 24 comes into surface contact with the mounting target M being substantially plate-shaped. As shown in FIGS. 1 and 2, the projecting portion 24 is configured to come into contact with one surface of the substantially plate-shaped mounting target M. Thereby, the projecting portion 24 receives a load applied to the main body portion 2 from the inner cable Ca by coming into surface contact with the mounting target M. The projecting portion 24 does not necessarily extend from the first wall portion 21 and/or the second wall portion 22 as long as the projecting portion 24 extends in a direction intersecting with the surface of the first wall portion 21 and/or the second wall portion 22 (for example, the projecting portion 24 may not be connected to the first wall portion 21 and/or the second wall portion 22, but may extend from the plane portion 23). In the present embodiment, as shown in FIGS. 6 and 7, the projecting portion 24 is configured by a plate-shaped body extending in a thickness direction of the main body portion 2 (direction perpendicular to the plane portion 23) from a position along a line connecting the one-side end P1 and the other-side end P2 of the guide path P.

The projecting portion 24 may be provided on both sides of the main body portion 2 in the thickness direction, but in the present embodiment, the projecting portion 24 is provided only on one side of the main body portion 2 in the thickness direction (see FIGS. 6 and 8). In the present embodiment, the above-mentioned reinforcing rib 25 is provided between the projecting portion 24, which is provided only on one side of the main body portion 2 in the thickness direction, and the plane portion 23. In this case, the projecting portion 24 and the reinforcing rib 25 are provided only on one side of the main body portion 2 in the thickness direction. In this case, in the casing cap 1, there is no portion that projects toward the other side in the thickness direction of the main body portion 2. Therefore, an installation space for the casing cap 1 can be reduced while increasing the strength of the casing cap 1.

In the present embodiment, the projecting portion 24 has a fixing portion 24*a* being fixable to the mounting target M via the fixing member F, as shown in FIGS. 2, 6, and 8. The fixing portion 24*a* is a portion that fixes the casing cap 1 to the mounting target M via a publicly-known fixing member (fastening member) F such as a bolt and a nut. In the present embodiment, the fixing portion 24*a* has a through hole H2 through which the fixing member F can be inserted. In a state where the through hole H2 provided in the fixing portion 24*a* and the through hole H1 of the fixed portion M3 of the mounting target M are aligned (see FIG. 5), the fixing member F is inserted into the through holes H1, H2. Thereby, the casing cap 1 is mounted to the mounting target M. In the present embodiment, as shown in FIG. 8, the fixing portion 24*a* of the projecting portion 24 is provided at a position where a distance L5 from the fixing portion 24*a* (the center of the through hole H2) to the outer casing connecting portion 3 (the center of the first insertion path 31) is shorter than a distance L6 from the fixing portion 24*a* (the center of the through hole H2) to the engaging portion 4 (second insertion path 41), in a direction connecting the first insertion path 31 and the second insertion path 41 (direction connecting the one-side end P1 and the other-side end P2 of the guide path P, left-right direction in FIG. 8). In other words, the position of the center of the through hole H2 of the fixing portion 24*a* is located at a position closer to the outer casing connecting portion 3 with respect to a central portion CT of a line LN connecting the center of the first insertion path 31 and the center of the second insertion path 41 (see the dashed line in FIG. 8). In this case, the fixing member F is fixed at a position close to the outer casing connecting portion 3. In the present embodiment, the outer casing connecting portion 3 is only temporarily held by the holding portion M2 of the mounting target M and is not completely fixed. In such a case, even if an external force is applied in the vicinity of the outer casing connecting portion 3, it is suppressed that the outer casing connecting portion 3 moves away from the holding portion M2 or wobbles since the fixing member F is fixed in the vicinity of the outer casing connecting portion 3. In the present embodiment, the casing cap 1 engages with the mounting target M in the plate thickness direction of the mounting target M, at two sites: the engaging portion 4 and the fixing member F. Thereby, movement of the casing cap 1 in the plate thickness direction of the mounting target M with respect to the substantially plate-shaped mounting target M is restricted.

Moreover, in the present embodiment, the position of the center of the through hole H2 of the fixing portion 24*a* is provided at a position closer to the central portion CT, among the first insertion path 31 and the central portion CT (position between the central portion CT and an intermediate portion CT2 which is positioned between the first insertion path 31 and the central portion CT), in the direction connecting the first insertion path 31 and the second insertion path 41 (left-right direction in FIG. 8). In this case, the fixing portion 24*a* is provided close to the outer casing connecting portion 3 and on the center side of the projecting portion 24, and the fixing member F is fastened at this position. Therefore, for example, even if the projecting portion 24 is not completely flat due to manufacturing variance, etc., the fixing member F is fastened at a position in the vicinity of the center of the projecting portion 24, so that the projecting portion 24 deforms to follow the surface of the substantially plate-shaped mounting target M. Thereby, a surface contact between the projecting portion 24 and the mounting target M is secured, and generation of a gap or wobbling between the projecting portion 24 and the mounting target M is suppressed.

In the present embodiment, the main body portion 2 comprises a fall-off prevention portion 27 covering at least a portion of the guide path P formed in a groove shape so as to prevent the inner cable Ca from falling off from the guide path P, as shown in FIGS. 6 and 7. The fall-off prevention portion 27 suppresses the inner cable Ca from being released from the guide path P, for example, during transportation before the inner cable Ca is attached to the operation target OP or during assembling of the inner cable Ca to the operation target OP. The inner cable Ca is not subjected to any force in a direction of being pressed against the bottom portion Pa of the guide path P before the inner cable Ca is attached to the operation target OP and applied with tension.

Therefore, the inner cable Ca may move in a direction away from the bottom portion Pa of the guide path P and fall off (is released) from the guide path P. In the present embodiment, since the main body portion 2 is provided with the fall-off prevention portion 27, the inner cable Ca is prevented from falling off from the guide path P. Therefore, it is not necessary to place the fallen-off inner cable Ca into the guide path P again and it is suppressed that other members hook on the fallen-off inner cable Ca. Accordingly, workability of assembling the inner cable Ca to the casing cap 1 can be improved.

An area and a position where the fall-off prevention portion 27 is provided are not limited as long as the fall-off prevention portion 27 can prevent the inner cable Ca from falling off from the guide path P, and the fall-off prevention portion 27 may cover at least a part of the entire guide path P. The fall-off prevention portion 27 is preferably provided partially (only on a part) along the guide path P. The fall-off prevention portion 27 is provided at a position where the fall-off prevention portion 27 comes into contact with the inner cable Ca when the inner cable Ca moves in the direction away from the bottom portion Pa of the guide path P. In the present embodiment, the fall-off prevention portion 27 is provided in a predetermined area facing the central portion of the guide path P in the extending direction (predetermined area centered on the point P3 in FIG. 2). The fall-off prevention portion 27 is not provided in a predetermined area from the one-side end P1 of the guide path P toward the central portion and in a predetermined area from the other-side end P2 of the guide path P toward the central portion, so the guide path P is partially open. In this case, the inner cable Ca can be pulled out from a portion not covered by the fall-off prevention portion 27 as shown in FIG. 9A, making it easier for the inner cable Ca to be inserted into the second insertion path 41.

Figure 10A:
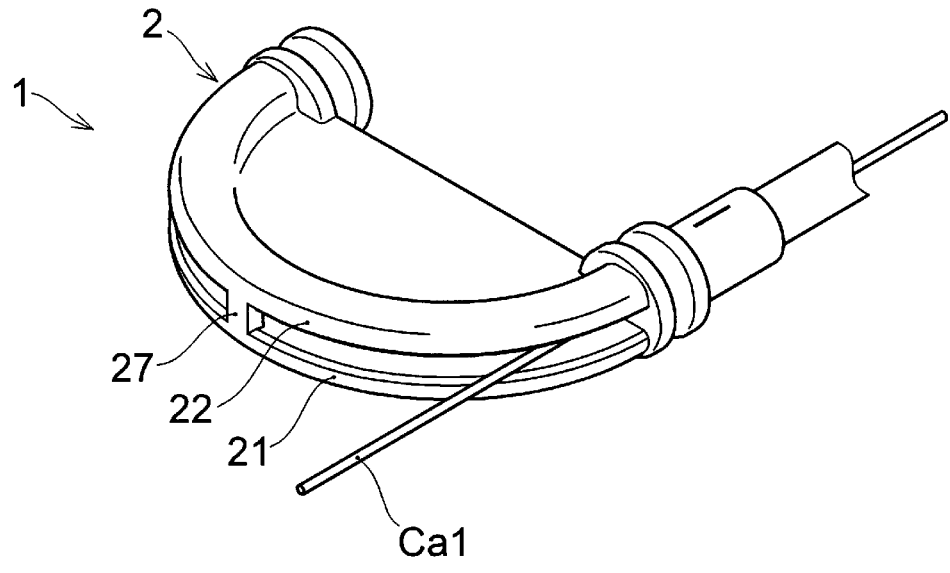
FIG. 10A is a perspective view showing a state where the cable main body is inserted into a first insertion path of a variation of the casing cap.
Figure 10B:
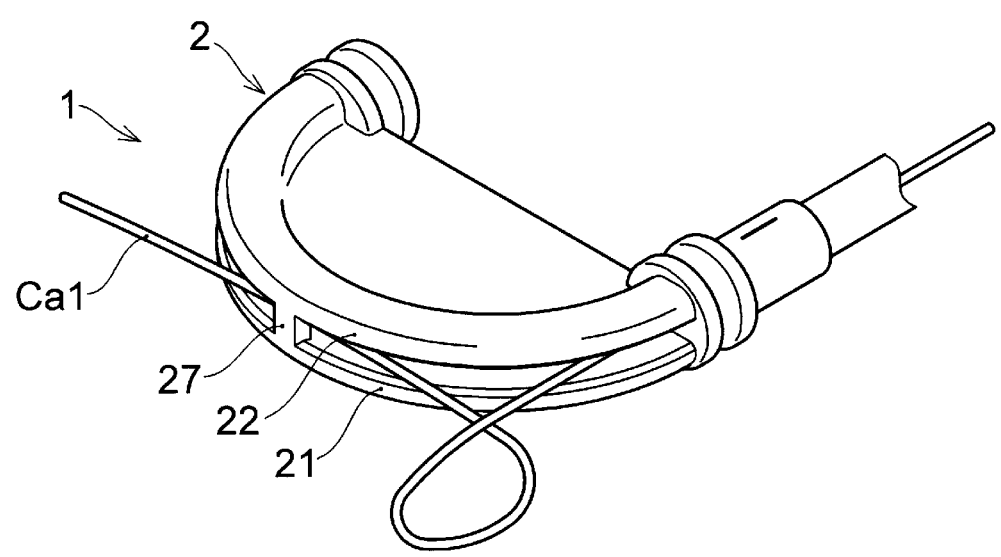
FIG. 10B is a perspective view showing a state where the cable main body is inserted between the fall-off prevention portion and the bottom of the guide path from the state shown in FIG. 10A.

In the present embodiment, the fall-off prevention portion 27 protrudes from the first wall portion 21 or the second wall portion 22 (in the present embodiment, from the first wall portion 21) in a thickness direction of the first wall portion 21 or the second wall portion 22, as shown in FIG. 6. The fall-off prevention portion 27 is configured by a roof-shaped protruding portion facing the bottom portion Pa of the guide path P. In the present embodiment, the fall-off prevention portion 27 protrudes perpendicularly to the inner surface Pb of the first wall portion 21 from the upper end of the first wall portion 21 (portion farthest from the projecting portion 24), as shown in FIG. 6. In the present embodiment, the fall-off prevention portion 27 protrudes to a position beyond the inner surface Pc of the second wall portion 22 (in the present embodiment, to the outer surface of the second wall portion 22 (surface opposite to the inner surface Pc of the second wall portion 22)). As shown in FIG. 6, the upper end of the second wall portion 22 is cut out so that the fall-off prevention portion 27 protruding from the first wall portion 21 does not interfere with the second wall portion 22. A gap G is formed between the fall-off prevention portion 27 and the upper end of the second wall portion 22. The inner cable Ca is assembled from this gap G toward the guide path P. The gap G is open in a direction perpendicular to the second wall portion 22. Thereby, it is possible to place the inner cable Ca from the gap G toward the guide path P in the direction perpendicular to the second wall portion 22. In the present embodiment, the gap G is a slit-shaped opening extending parallel to the direction connecting the one-side end P1 and the other-side end P2 of the guide path P. In the present embodiment, the gap G is larger than the thickness (outer diameter) of the inner cable Ca. In this case, the inner cable Ca can be easily moved from the gap G to the guide path P without resistance. Furthermore, no excessive force is applied to the inner cable Ca or the fall-off prevention portion 27, thereby suppressing the inner cable Ca from being scratched and suppressing the fall-off prevention portion 27 from being damaged. It should be noted that the fall-off prevention portion 27 may be provided so as to connect the first wall portion 21 and the second wall portion 22 without having a gap G, as shown in FIGS. 10A and 10B.

Next, a method of assembling the inner cable Ca to the casing cap 1 of the present embodiment will be explained using FIGS. 9A to 9C. It should be noted that the following explanation is merely an example, and the present invention is not limited by the following explanation.

Figure 9A:
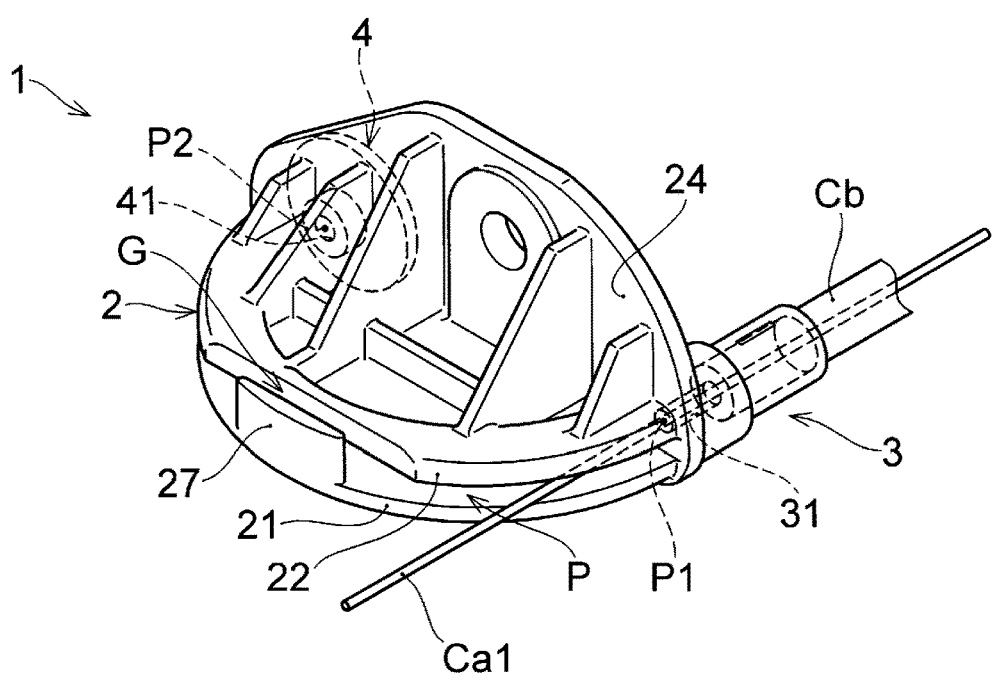
FIG. 9A is a perspective view showing a state where a cable main body is inserted into a first insertion path of the casing cap in FIG. 1.

As shown in FIG. 9A, with the outer casing Cb being connected to the outer casing connecting portion 3, the cable main body Ca1, on which the cable end Ca2 is not yet provided, is inserted into the first insertion path 31. The cable main body Ca1 is pulled out from an open part between the fall-off prevention portion 27 and the one-side end P1 of the guide path P, of the guide path P, to the outside of the casing cap 1.

Figure 9B:
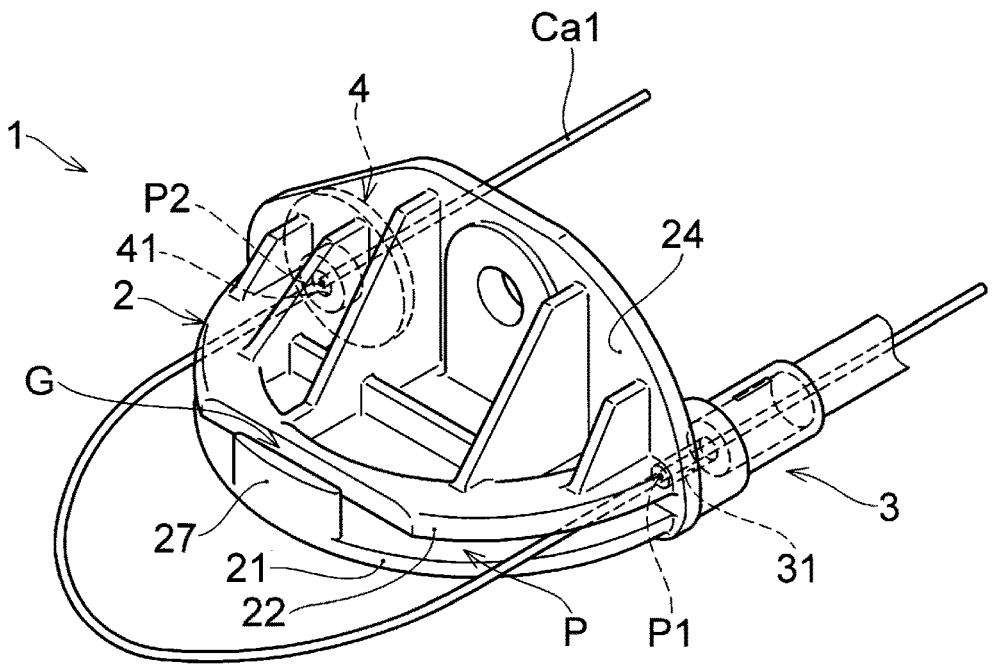
FIG. 9B is a perspective view showing a state where the cable main body is inserted into a second insertion path from the state shown in FIG. 9A.

Next, as shown in FIG. 9B, the cable main body Ca1 is inserted from the open part of the guide path P between the fall-off prevention portion 27 and the other-side end P2 of the guide path P, of the guide path P, into the second insertion path 41. Next, as shown in FIG. 9C, the cable main body Ca1 is moved from the gap G toward the guide path P (moved from the state indicated by the two-dot chain line to the state indicated by the solid line in FIG. 9C). Thereby, as shown in FIG. 9C, the cable main body Ca1 enters into the guide path P and is restricted from moving in the direction away from the guide path P by the fall-off prevention portion 27. Since no force in the direction from the guide path P toward the gap G (direction perpendicular to the first wall portion 21) is applied to the cable main body Ca1 that has entered into the guide path P, the cable main body Ca1 is suppressed from falling off from the guide path P. Moreover, in a case where there is no fall-off prevention portion 27, when the cable main body Ca1 moves far away from the bottom portion Pa of the guide path P, the tip of the cable main body Ca1 may come off from the second insertion path 41. However, when the fall-off prevention portion 27 is provided, movement of the cable main body Ca1 is restricted, and therefore the tip of the cable main body Ca1 is restricted from coming off from the second insertion path 41. Moreover, in the present embodiment, a gap G is formed between the fall-off prevention portion 27 and the second wall portion 22. With this gap G, as mentioned above, the cable main body Ca1 can be placed into the guide path P by moving in the direction perpendicular to the first wall portion 21. Therefore, it is suppressed that the cable main body Ca1 is twisted as shown in FIGS. 10A and 10B in which there is no gap G when the cable main body Ca1 is placed into the guide path P. Specifically, in FIGS. 10A and 10B, although the fall-off prevention portion 27 is provided, the fall-off prevention portion 27 connects the first wall portion 21 and the second wall portion 22 so as to bridge them and is not provided with a gap G. In such a case, it is necessary to pass the cable main body Ca1 between the fall-off prevention portion 27 and the bottom portion Pa of the guide path P. At this time, the cable main body Ca1 is once pulled out as shown in FIG. 10A, and then when the cable main body Ca1 is passed between the fall-off prevention portion 27 and the bottom portion Pa of the guide path P, the cable main body Ca1 may be twisted as shown in FIG. 10B. In the present embodiment, as shown in FIG. 9C, the cable main body Ca1 can be moved from the gap Gin a direction perpendicular to the first wall portion 21 and placed into the guide path P. Therefore, when inserting the cable main body Ca1 between the fall-off prevention portion 27 and the bottom portion Pa of the guide path P, it is suppressed that the cable main body Ca1 is twisted. In the examples shown in FIGS. 9A to 9C, the cable main body Ca1 is placed between the fall-off prevention portion 27 and the bottom portion Pa of the guide path P after being passed through the second insertion path 41. However, the cable main body Ca1 may be passed through the second insertion path 41 after being inserted between the fall-off prevention portion 27 and the bottom portion Pa of the guide path P.

Figure 9C:
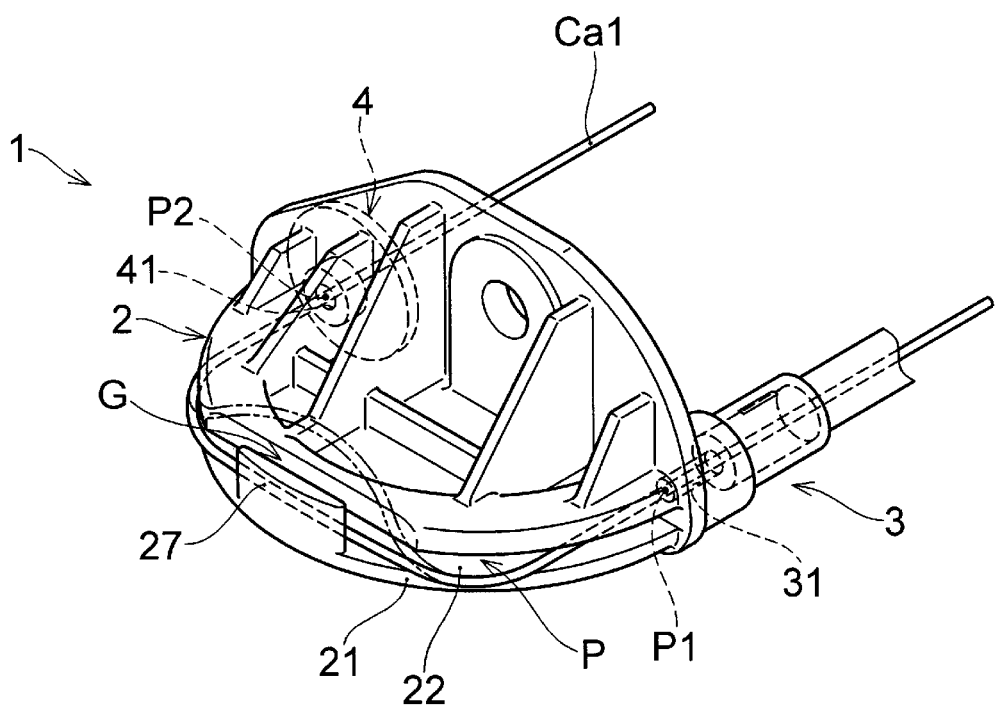
FIG. 9C is a perspective view showing a state where the cable main body is placed through a gap between a fall-off prevention portion and an upper end of a second wall portion into a guide path from the state shown in FIG. 9B.

In the state shown in FIG. 9C, the cable end Ca2 is provided at the tip of the cable main body Ca1 by a known means such as casting, to complete assembly of the casing cap 1. It should be noted that fixing of the outer casing Cb to the outer casing connecting portion 3 by caulking can be conducted at any timing, and the attached member 32 shown in FIG. 1 is omitted from illustration in figures other than FIG. 1.

Second Embodiment

Next, the casing cap of the second embodiment will be explained using FIGS. 11 to 15. The casing cap 1 of the present embodiment is different from the first embodiment in that the casing cap 1 has no projecting portion and is fixed to the mounting target M by a second engaging portion 33 provided on the outer casing connecting portion 3 and an engaging claw 28, in addition to the engaging portion 4.

In the following descriptions, descriptions of matters common to the first embodiment mentioned above will be omitted, focusing on the differences. It should be noted that all of the matters described in the first embodiment can be applied to the casing cap of the second embodiment as long as the purpose of the invention can be achieved, and the configuration of the present embodiment and the contents described in the first embodiment can be used in combination. Moreover, the effects obtained by the configuration described in the first embodiment can also be obtained in the second embodiment as long as the configuration is included.

Figure 11:
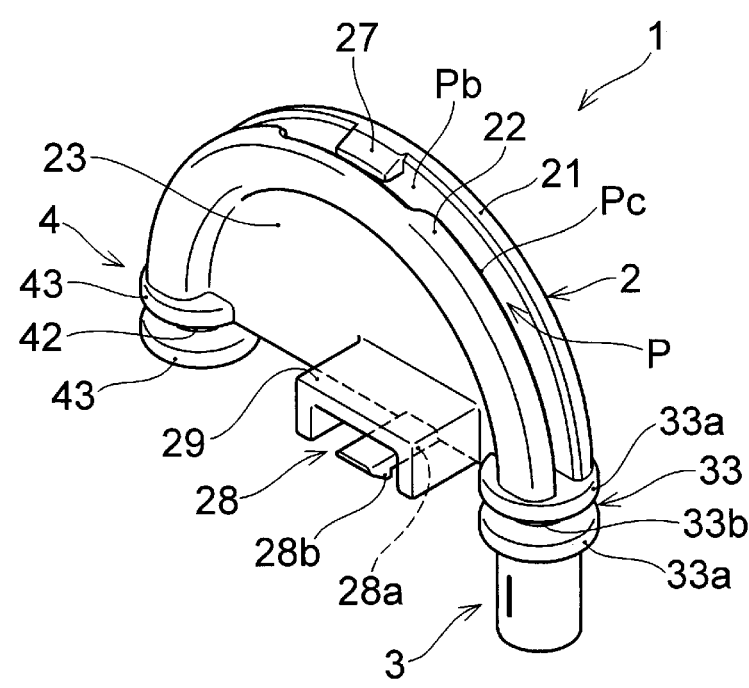
FIG. 11 is a perspective view of a casing cap according to a second embodiment.
Figure 12:
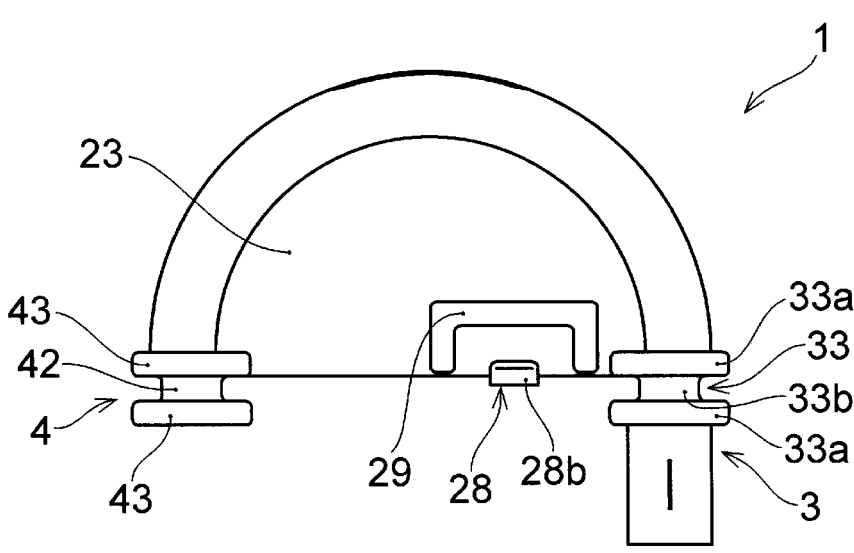
FIG. 12 is a front view of the casing cap according to the second embodiment.

As shown in FIGS. 11 and 12, in the present embodiment, the outer casing connecting portion 3 has a second engaging portion 33. The second engaging portion 33 has a flange portion 33a, like the engaging portion 4. Specifically, the second engaging portion 33 has a cylindrical portion 33b and a pair of flange portions 33a on both sides in an axial direction of the cylindrical portion 33b. The cylindrical portion 42 of the engaging portion 4 and the cylindrical portion 33b of the second engaging portion 33 enter into the engaged portion M1 (see FIG. 14) provided on the substantially plate-shaped mounting target M, and the pair of flange portions 33a, 43, provided at both ends in an axial direction of the cylindrical portion 33b, 42, engage with both surfaces of the mounting target M, respectively.

Moreover, in the present embodiment, the casing cap 1 has an engaging claw 28 engaging with a second engaged portion M4 (see FIGS. 14 and 15) provided on the mounting target M so that the engagements of the engaging portion 4 and the second engaging portion 33 with the mounting target M are not released. In the present embodiment, the engaging claw 28 protrudes from both surfaces of the plane portion 23 (symmetrically with respect to the plane portion 23). In this case, for example, when the casing cap 1 needs to be provided at a plurality of positions with different installation targets such as left and right sides of a vehicle seat, with the orientation of the casing cap 1 being changed, a casing cap 1 having the same shape can be used in common.

Figure 14:
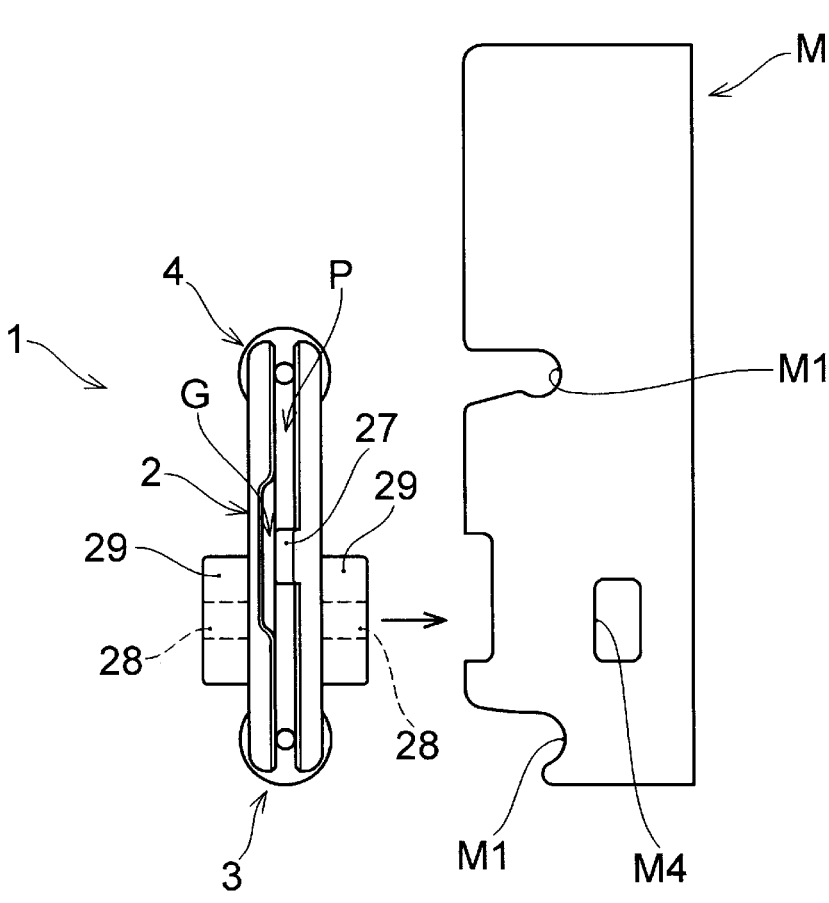
FIG. 14 is a view showing a state before the casing cap according to the second embodiment is mounted to the mounting target.
Figure 15:
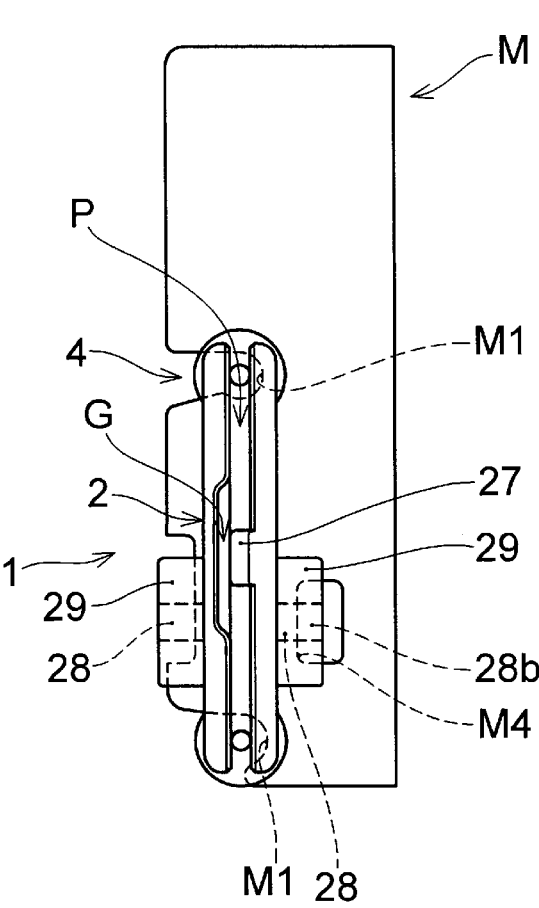
FIG. 15 is a view showing a state where the casing cap is mounted to the mounting target from the state shown in FIG. 14.

As shown in FIG. 11, the engaging claw 28 has an arm portion 28a extending in a direction perpendicular to the plane portion 23 and a claw portion 28b provided at the tip of the arm portion 28a. The arm portion 28a is configured to be elastically deformable. The claw portion 28b is configured to engage with the second engaged portion M4 of the mounting target M (see FIG. 15). In the present embodiment, the second engaged portion M4 has a through hole or a recessed portion provided in the mounting target M. In the present embodiment, as shown in FIGS. 14 and 15, when the engaging portion 4 and the second engaging portion 33 of the casing cap 1 are engaged with the engaging grooves of the pair of engaged portions M1, the claw portion 28b of the engaging claw 28 gets on the surface of the mounting target M and the arm portion 28a deforms with the connecting portion, which is connected to the plane portion 23, as a fulcrum. At this time, the claw portion 28b slides on the surface of the mounting target M. When the claw portion 28b reaches a position where the claw portion 28b can engage with the second engaged portion M4, the arm portion 28a restores so as to return to its original position, and the claw portion 28b engages with the second engaged portion M4 (see FIG. 15). In the present embodiment, when the casing cap 1 is moved relative to the mounting target M to reach a predetermined position where the engaging portion 4 and the second engaging portion 33 engage with the pair of engaged portions M1, the engaging claw 28 engages with the second engaged portion M4. Thus, the casing cap 1 can be fixed simply by moving the casing cap 1 to the predetermined position on the mounting target M. Therefore, the attachment work between the casing cap 1 and the mounting target M becomes easy.

In the present embodiment, the main body portion 2 has a protective wall 29 protecting the engaging claw 28, as shown in FIGS. 11 and 12. When the protective wall 29 is provided, it is suppressed that an external force is applied to the engaging claw 28 during, for example, transportation of the casing cap 1, and the engaging claw 28 is damaged. In the present embodiment, as shown in FIGS. 11 and 12, the protective wall 29 surrounds the engaging claw 28 on three directions except for a protruding direction of the claw portion 28b. The protective wall 29 is provided so that a protrusion amount of the protective wall 29 is greater than a protrusion amount of the engaging claw 28 from the plane portion 23. Moreover, a predetermined gap is provided between the protection wall portion 29 and the arm portion 28a so as to allow an elastic deformation of the arm portion 28a. A shape and a structure of the protective wall 29 are not limited as long as the protective wall 29 is provided so as to function as a barrier that makes an external force to be less likely to be applied to the engaging claw 28.

Figure 13:
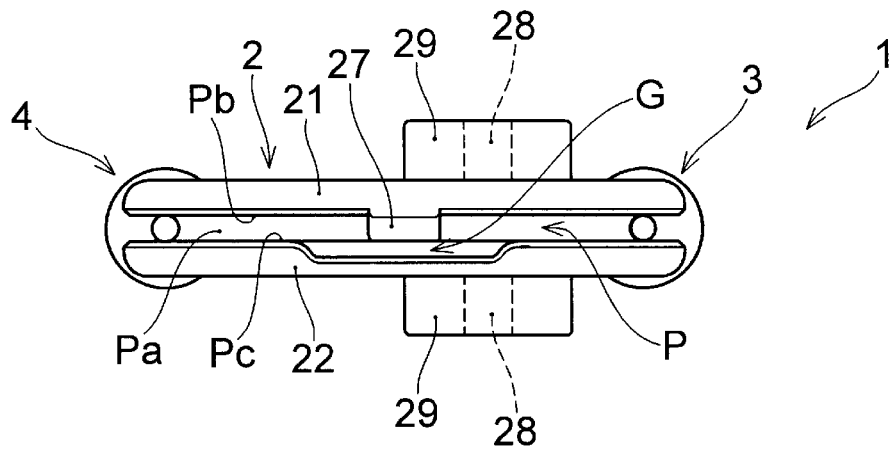
FIG. 13 is a top view of the casing cap according to the second embodiment.

In the present embodiment, the fall-off prevention portion 27 protrudes from the first wall portion 21. As shown in FIGS. 11 and 13, in the present embodiment, the fall-off prevention portion 27 tapers toward its tip. In the present embodiment, the fall-off prevention portion 27 protrudes to the position of the inner surface Pc of the second wall portion 22. The upper end of the second wall portion 22 is slightly cut away in a direction away from the fall-off prevention portion 27 at the portion where the fall-off prevention portion 27 is provided, so that a gap G is formed between the fall-off prevention portion 27 and the second wall portion 22 (see FIGS. 11 and 13). In the present embodiment, the gap G is formed to be smaller than the thickness (outer diameter) of the cable main body Ca1. In assembling the cable main body Ca1, when the cable main body Ca1 is pressed into the gap G between the fall-off prevention portion 27 and the second wall portion 22, the fall-off prevention portion 27 is slightly deformed to widen the gap G, so that the cable main body Ca1 can be moved to the guide path P. In the present embodiment, since the gap G between the fall-off prevention portion 27 and the second wall portion 22 is formed to be smaller than the thickness of the cable main body Ca1, the cable main body Ca1 is more reliably prevented from falling off from the guide path P.

Although the embodiments of the present invention have been described above, the present invention is not limited to the above-described embodiments. The above-described embodiments mainly explain the inventions having the following configurations.

(1) A casing cap connected to an end of an outer casing through which an inner cable is inserted, the casing cap comprising:

i. a main body portion having a curved guide path guiding the inner cable in a curved state;

ii. an outer casing connecting portion protruding from the main body portion at a one-side end in an extending direction of the guide path; and iii. an engaging portion for engaging the casing cap with a mounting target, wherein the engaging portion protrudes from the main body portion at an other-side end in the extending direction of the guide path.

(2) The casing cap of (1), wherein the outer casing connecting portion has a first insertion path through which the inner cable is inserted, wherein the engaging portion has a second insertion path through which the inner cable is inserted, and wherein a protrusion amount of the engaging portion from the main body portion in the extending direction of the second insertion path is smaller than a protrusion amount of the outer casing connecting portion from the main body portion in the extending direction of the first insertion path.

(3) The casing cap of (1) or (2), wherein the engaging portion is configured to be mountable to the mounting target being substantially plate-shaped, wherein the engaging portion has a cylindrical portion that extends with a length corresponding to a thickness of the mounting target and has the second insertion path in the cylindrical portion and a flange portion that protrudes outward in a radial direction of the second insertion path with respect to the cylindrical portion, and wherein an lead-out port through which the inner cable is led out to an outside of the casing cap is provided on an end face on an opposite side to the main body portion, among end faces of the flange portion.

(4) The casing cap of any one of (1) to (3), wherein the main body portion comprises a first wall portion and a second wall portion provided opposite to the first wall portion, wherein the guide path extends between the first wall portion and the second wall portion, wherein the main body portion comprises a projecting portion extending in a direction intersecting with the first wall portion and/or the second wall portion so that, when the engaging portion is mounted to the mounting target being substantially plate-shaped, the projecting portion comes into surface contact with the mounting target being substantially plate-shaped, and wherein the projecting portion has a fixing portion being fixable to the mounting target via a fixing member.

(5) The casing cap of any one of (1) to (4), wherein the guide path is formed in a groove shape extending along the extending direction of the guide path, and wherein the main body portion comprises a fall-off prevention portion covering at least a portion of the guide path formed in a groove shape so as to prevent the inner cable from falling off from the guide path.

(6) The casing cap of any one of (1) to (5), wherein the main body portion has a plane portion on an inside of a curved portion of the curved guide path.

(7) A control cable connecting structure, the control cable connecting structure comprising:

an inner cable;

an outer casing through which the inner cable is inserted;

an operation target to which one end of the inner cable is connected;

a casing cap according to any one of claims 1 to 6; and a mounting target being substantially plate-shaped, wherein the mounting target engages with the engaging portion of the casing cap and extends substantially perpendicularly to the inner cable led out from the engaging portion, wherein the operation target is configured to:

move between a first position and a second position by being operated by the inner cable; or operate the inner cable by moving between the first position and the second position, wherein the first position is a position closer to the engaging portion with respect to the second position, and wherein a length from the operation target to the engaging portion in the first position is shorter than a radius of curvature of the curved guide path.

What is claimed is:

1. A casing cap connected to an end of an outer casing through which an inner cable is inserted, the casing cap comprising:

a main body portion having a curved guide path guiding the inner cable in a curved state;

an outer casing connecting portion linearly protruding in a direction in which the guide path is linearly extended from the main body portion at a one-side end in an extending direction of the guide path; and an engaging portion for engaging the casing cap with a mounting target, wherein the engaging portion linearly protrudes in a direction in which the guide path is linearly extended from the main body portion at an other-side end in the extending direction of the guide path, wherein the outer casing connecting portion has a first insertion path through which the inner cable is inserted, wherein the engaging portion has a second insertion path through which the inner cable is inserted, wherein the engaging portion is integral with the main body portion, the engaging portion and the main body portion being formed as one piece, and wherein a protrusion amount of the engaging portion from the main body portion in the extending direction of the second insertion path is smaller than a protrusion amount of the outer casing connecting portion from the main body portion in the extending direction of the first insertion path.

2. The casing cap according to claim 1, wherein the engaging portion is configured to be mountable to the mounting target being substantially plate-shaped, wherein the engaging portion has a cylindrical portion that extends with a length corresponding to a thickness of the mounting target and has the second insertion path in the cylindrical portion and a flange portion that protrudes outward in a radial direction of the second insertion path with respect to the cylindrical portion, and wherein a lead-out port through which the inner cable is led out to an outside of the casing cap is provided on an end face on an opposite side to the main body portion, among end faces of the flange portion.

3. The casing cap according to claim 2, wherein the main body portion comprises a first wall portion and a second wall portion provided opposite to the first wall portion, wherein the guide path extends between the first wall portion and the second wall portion, wherein the main body portion comprises a projecting portion extending in a direction intersecting with the first wall portion and/or the second wall portion so that, when the engaging portion is mounted to the mounting target being substantially plate-shaped, the projecting portion comes into surface contact with the mounting target being substantially plate-shaped, and wherein the projecting portion has a fixing portion being fixable to the mounting target via a fixing member.

4. The casing cap according to claim 1, wherein the guide path is formed in a groove shape extending along the extending direction of the guide path, and wherein the main body portion comprises a fall-off prevention portion covering at least a portion of the guide path formed in a groove shape so as to prevent the inner cable from falling off from the guide path.

5. The casing cap according to claim 1, wherein the main body portion has a plane portion on an inside of a curved portion of the curved guide path.

6. A control cable connecting structure, the control cable connecting structure comprising:

an inner cable;

an outer casing through which the inner cable is inserted;

an operation target to which one end of the inner cable is connected;

a casing cap according to claim 1; and a mounting target being substantially plate-shaped, wherein the mounting target engages with the engaging portion of the casing cap and extends substantially perpendicularly to the inner cable led out from the engaging portion, wherein the operation target is configured to:

move between a first position and a second position by being operated by the inner cable; or operate the inner cable by moving between the first position and the second position, wherein the first position is a position closer to the engaging portion with respect to the second position, and wherein a length from the operation target to the engaging portion in the first position is shorter than a radius of curvature of the curved guide path.

7. A control cable connecting structure, the control cable connecting structure comprising:

an inner cable;

an outer casing through which the inner cable is inserted;

an operation target to which one end of the inner cable is connected;

a casing cap; and a mounting target being substantially plate-shaped, wherein the casing cap comprises:

a main body portion having a curved guide path guiding the inner cable in a curved state;

an outer casing connecting portion protruding from the main body portion at a one-side end in an extending direction of the guide path; and an engaging portion for engaging the casing cap with a mounting target, wherein the engaging portion protrudes from the main body portion at an other-side end in the extending direction of the guide path, wherein the mounting target engages with the engaging portion of the casing cap and extends substantially perpendicularly to the inner cable led out from the engaging portion wherein the operation target is configured to:

move between a first position and a second position by being operated by the inner cable; or operate the inner cable by moving between the first position and the second position, wherein the first position is a position closer to the engaging portion with respect to the second position, and wherein a length from the operation target to the engaging portion in the first position is shorter than a radius of curvature of the curved guide path.

* * * * *